Nov. 29, 1938.                S. TRUITT                 2,138,716
                        BREAD CRUMBING MACHINE
                        Filed Sept. 28, 1937         2 Sheets-Sheet 1

Inventor
SHELLY TRUITT.
By Howard J. Whelan.
Attorney

Nov. 29, 1938.   S. TRUITT   2,138,716
BREAD CRUMBING MACHINE
Filed Sept. 28, 1937   2 Sheets-Sheet 2

Inventor
SHELLY TRUITT.
By Howard J. Whelan.
Attorney

Patented Nov. 29, 1938

2,138,716

UNITED STATES PATENT OFFICE 2,138,716

BREAD CRUMBING MACHINE

Shelly Truitt, Baltimore, Md., assignor to John Marion Seney, Baltimore, Md.

Application September 28, 1937, Serial No. 166,199

5 Claims. (Cl. 146—177)

This invention relates to comminuting devices such as are used for producing crumbs and has special reference to a bread crumbing machine.

Many restaurants, hotels and the like use large quantities of bread crumbs for frying, as well as for stuffing fowls and other foods. The ordinary way of preparing these crumbs is first to dry the bread very thoroughly and then to comminute the same on a grater. Such an operation requires a great deal of time and the production of the product is slow.

One important object of the present invention is to provide a novel machine wherein bread, either in its dried or comparatively fresh condition may be placed and quickly reduced to crumbs.

A second important object of the invention is to provide a machine of this character having adjustable means whereby the size of the crumbs can be regulated.

A third important object of the invention is to provide a novel grater for a machine of this character.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
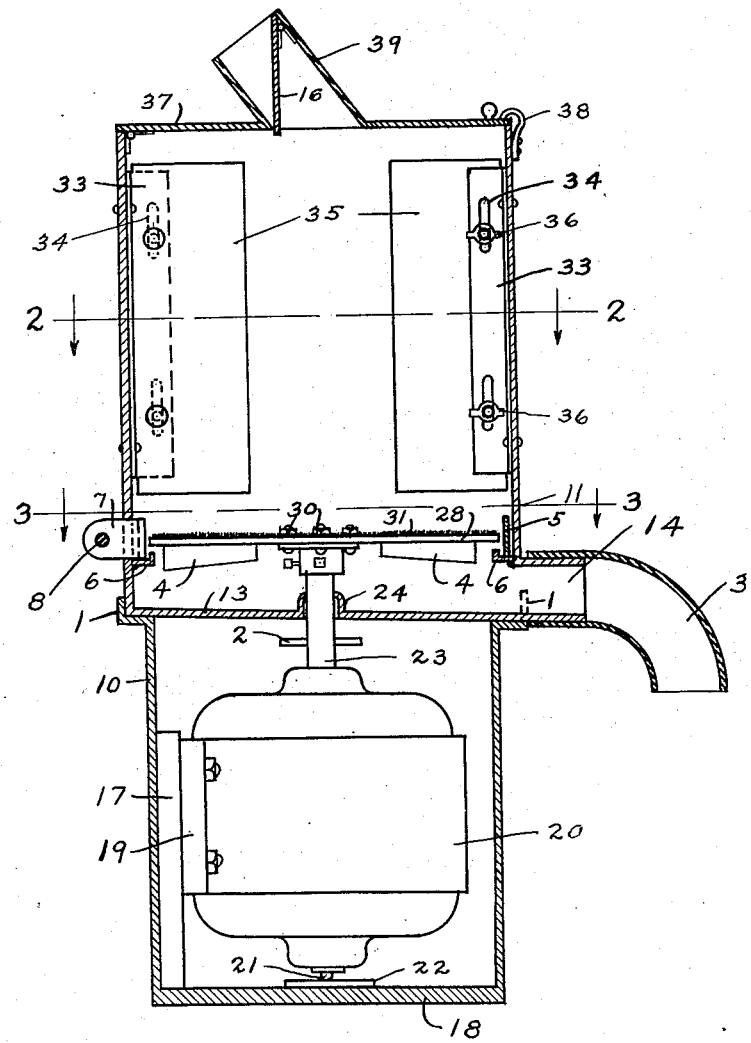
Figure 1 is a vertical section through the improved crumbing machine.
Figure 2:
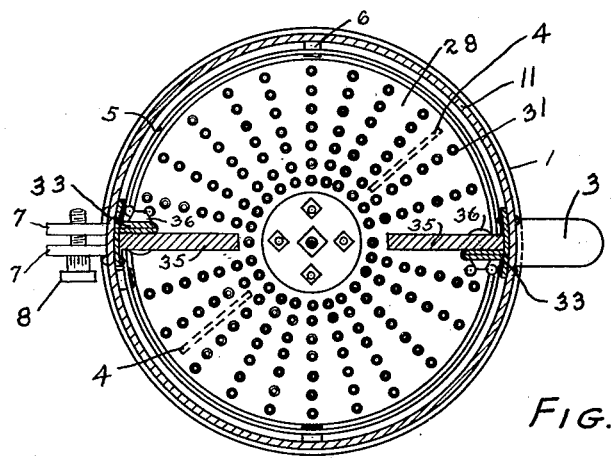
Figure 2 is a section on the line 2—2 of Figure 1.
Figure 3:
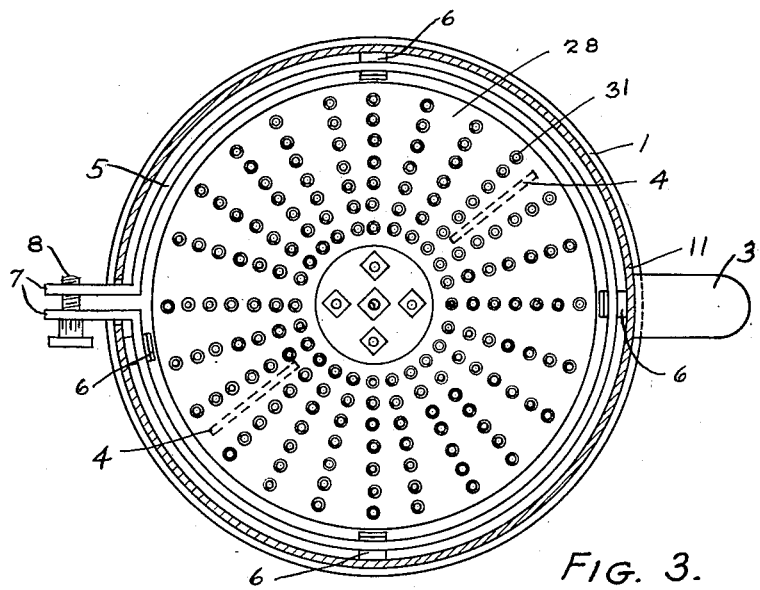
Figure 3 is an enlarged section on the line 3—3 of Figure 1.
Figure 4:
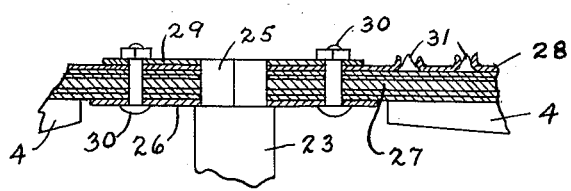
Figure 4 is a detail section through the central part of the grater disc.

In the present embodiment of the invention there is disclosed a suitable frame 10 on which is supported a cylindrical container 11, removably secured to the frame by a clamping tray 1. The lower end of this container is provided with a stationary inclined floor pan 13 slanting towards a delivery spout 14, and just below this floor is provided an auxiliary spout member 3 suitably secured. Mounted on the frame 10 is a bracket 17 and a horizontal base plate 18 and to the bracket 17, the base 19 of a motor 20 is secured. This motor, in rotating its shaft 23, causes the circular parts 27, 28, 29 attached to same, to rotate with it, its shaft being vertically disposed. The lower end of this shaft is supported on a ball bearing 21 forming a thrust bearing and resting on a special bearing plate 22 supported on the horizontal plate 18. To the upper end portion of this motor shaft 23 is fixed an extension disc 2 situated close but under the inclined floor pan 13. A guard tube and stuffing box member 24 surrounding this part of the shaft above the floor prevents dust from the bread crumbs getting through the floor. The disc 2 also prevents crumbs passing into the motor bearings. The motor shaft 23 passes through the guard tube 24 as noted and its upper end portion 25 is machined to polygonal form. On this upper end is fitted a plate 26 suitably soldered or otherwise secured and on this plate rests a circular grater support 27 preferably of laminated wood. On the circular support 27 rests a metallic circular grater plate 28. A cover plate 29 engages the central part of the plate 28 so that bolts 30 may pass through and clamp the plates 26, 29, 27 and 28 firmly together. The plate 28 is punched with a special tool to provide groups of upstanding sharpened prongs 31 arranged in any suitable manner all over the plate, as shown in Figures 2 and 4. Extending vertically inside the container above the grater plate are L-shaped wall brackets 33. These are provided with suitable slots 34. Placed against these brackets are radial baffle plates 35 secured thereto by means of the bolts and nuts 36 passing through the slots 34. This is so that baffles 35 may be vertically adjusted toward and from the grater plate and then secured in position. On top of the container 11 is a hinged lid 37 fastened down by a latch 38 and provided with an orifice inlet 39, having a swinging check door 16. The under side of the support 27 is arranged with propellor blades 4 shaped as indicated, to provide a suitable airdraft and mechanical pusher for crawing crumbs into the space above and adjacent to the inclined floor 13 and forcing same towards the delivery spout 14. Around the periphery of the plates 27 and 28, but spaced away from same, is an adjustable band member 5 for controlling the size of the crumbs permitted to pass through from the cylinder into the inclined floor pan. The adjustable band member is mounted on the inside wall of the cylinder and supported by the grooved shelf 6 as shown. The band member has arms 7 extending from it suitably and the adjusting screw 8 to permit it to be decreased or increased in diameter, and thereby make the peripheral space about the plates mentioned greater or smaller. The greater this space is the greater will be the size of the crumbs passed from the cylinder container to the inclined floor pan, and the smaller the space, the smaller the crumbs.

In operation, the baffles 35 are adjusted in accordance with the needs of the crumbs and it is to be understood that the diameter of the grater plate and its supporting plate are such as to leave an annular or peripheral space between the periphery of the plate and the wall of the container as before mentioned. The width of this space has a controlling influence on the size of the crumbs produced and the adjustment of the baffles 35 controls the grating or comminuting process. The bread is now broken, either fresh or dried, and dropped through the orifice member 39 and the motor started. The grater plate revolves rapidly and the bread crumbs, made through centrifugal action, will move out toward the peripheral space and fall to the inclined floor pan. The bread engages the baffles during the process, being held by the baffles while the grater is dragged beneath and against them. In practical operation it is found that the broken up pieces are themselves caught and grated until all of the bread has been reduced to practically uniform size of crumbs, the crumbs passing through the annular opening around the plates, to the inclined pan and out the spout 14. The inlet orifice member 39 prevents pieces of the bread or bread-dust being thrown or blown out by the action of the device in tumbling the contents of the container about.

There has thus been provided a simple, efficient and adjustable device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed is:—

1. In a crumbing machine, a container having an open bottom, a bottom section secured to the lower end of said container having a downwardly and outwardly inclined portion forming a pan and chute terminating in an outlet opening therein, a vertical and rotatable shaft extending through the pan and chute of said bottom portion and into the container, means secured within the lower portion of said container forming a guide for said shaft, a plate carried on the upper end of said shaft and provided with sharpened prongs projecting upwardly from the upper face thereof, brackets secured on the inner wall of said container at diametrically opposite points thereon, each of said brackets being formed from a single sheet of metal looped upon itself midway of its width and having the end portion bent outwardly whereby to provide a doubled central angular strip and a pair of oppositely projecting flanges, the flanges being secured to the inner wall of said container and the outwardly doubled strip having slots therein, baffle plates applied to the outwardly projecting portion of the brackets, bolts carried by said baffle plates entering the slots of said brackets and means engaging the bolts and brackets to adjustably secure the baffle plates in position in the container with relation to said rotatable disc, as and for the purposes described.

2. In a bread crumbing machine, a cylindrical container having an open bottom, a vertical and rotatable shaft extending through said bottom section and into the container, support means secured within the lower portion of said container forming a guide for said shaft, a plate carried on the upper end of said shaft and provided with sharpened prongs projecting upwardly from the upper face thereof, brackets secured on the inner wall of said container at diametrically opposite points thereon, each of said brackets being formed from a single sheet of metal looped upon itself midway of its width and having the end portion bent outwardly whereby to provide a doubled central angular strip and a pair of oppositely projecting flanges, the flanges being secured to the inner wall of said container and the outwardly doubled strip having slots therein, baffle plates applied to the outwardly projecting portion of the brackets, bolts carried by said baffle plates entering the slots of said brackets, and means engaging the bolts and brackets to adjustably secure the baffle plates in position in the container with relation to said rotatable plate, as and for the purposes described.

3. In a bread crumbing machine, a cylindrical container having an open bottom, a vertical and rotatable shaft extending through said bottom section and into the container, support means secured within the lower portion of said container forming a guide for said shaft, a plate carried on the upper end of said shaft and provided with sharpened prongs projecting upwardly from the upper face thereof, brackets secured on the inner wall of said container at diametrically opposite points thereon, each of said brackets having slots therein, baffle plates applied to the outwardly projecting portion of the brackets, bolts carried by said baffle plates entering the slots of said brackets, and means engaging the bolts and brackets to adjustably secure the baffle plates in position in the container with relation to said rotatable plate, as and for the purposes described.

4. In a bread crumbing machine, a cylindrical container having an open bottom, a vertical and rotatable shaft extending through said bottom section and into the container, support means secured within the lower portion of said container forming a guide for said shaft, a plate carried on the upper end of said shaft and provided with sharpened prongs projecting upwardly from the upper face thereof, brackets secured on the inner wall of said container at diametrically opposite points thereon, each of said brackets being formed from a single sheet of metal looped upon itself midway of its width and having the end portion bent outwardly whereby to provide a doubled central angular strip and a pair of oppositely projecting flanges, the flanges being secured to the inner wall of said container and the outwardly doubled strip having slots therein, baffle plates applied to the outwardly projecting portion of the brackets, bolts carried by said baffle plates entering the slots of said brackets, means engaging the bolts and brackets to adjustably secure the baffle plates in position in the container with relation to said rotatable plate, and means peripherally disposed with respect to the said plates for adjusting the emptying space for the crumbs and controlling the size of same.

5. In a bread crumbing machine, a cylindrical container having an open bottom, a vertical and rotatable shaft extending through said bottom section and into the container, support means secured within the lower portion of said container, forming a guide for said shaft, a plate carried on the upper end of said shaft and provided with sharpened prongs projecting upwardly from the upper face thereof, brackets secured on the inner wall of said container at diametrically opposite points thereon, each of said brackets having slots therein, baffle plates applied to the outwardly projecting portion of the brackets, bolts carried by said baffle plates entering the slots of said brackets, means engaging the bolts and brackets to adjustably secure the baffle plates in position in the container with relation to said rotatable plate, and a band member surrounding said plate but spaced therefrom to provide a peripheral space about the same to permit the crumbs to pass therefrom, and an inclined floor pan disposed under said plate to receive the crumbs.

SHELLY TRUITT.